US008086673B2

(12) United States Patent
Lam et al.

(10) Patent No.: US 8,086,673 B2
(45) Date of Patent: Dec. 27, 2011

(54) METHOD AND SYSTEM FOR GENERATING AND PROCESSING ELECTRONIC MEETING COMMUNICATIONS FOR MULTIPLE FORMATS

(75) Inventors: Wing Young Lam, Waterloo (CA); Anh Ngoc Van, Cambridge (CA)

(73) Assignee: Research In Motion Limited, Waterloo, Ontario (CA)

( * ) Notice: Subject to any disclaimer, the term of this patent is extended or adjusted under 35 U.S.C. 154(b) by 759 days.

(21) Appl. No.: 11/447,895

(22) Filed: Jun. 7, 2006

(65) Prior Publication Data

US 2007/0288658 A1 Dec. 13, 2007

(51) Int. Cl.
*G06F 15/16* (2006.01)
(52) U.S. Cl. ......... 709/206; 709/230; 709/245; 709/246
(58) Field of Classification Search .................. 709/206, 709/246
See application file for complete search history.

(56) References Cited

U.S. PATENT DOCUMENTS

| | | | |
|---|---|---|---|
| 6,016,478 A | 1/2000 | Zhang | |
| 6,463,463 B1 | 10/2002 | Godfrey | |
| 2003/0018816 A1* | 1/2003 | Godfrey et al. | 709/246 |
| 2003/0135565 A1 | 7/2003 | Estrada | |
| 2004/0139162 A1 | 7/2004 | Adams | |
| 2004/0141005 A1 | 7/2004 | Banatwala | |
| 2004/0143472 A1* | 7/2004 | Estrada et al. | 705/8 |
| 2006/0112188 A1* | 5/2006 | Albanese et al. | 709/238 |
| 2006/0247961 A1* | 11/2006 | Klemow | 705/8 |
| 2007/0088801 A1* | 4/2007 | Levkovitz et al. | 709/217 |
| 2007/0143685 A1* | 6/2007 | Stillion et al. | 715/733 |

FOREIGN PATENT DOCUMENTS

WO WO2005/004441 A 1/2005

OTHER PUBLICATIONS

Bret Swedeen. "Notes from Support: Conversion Services of the SMTP MTA" Internet Citation, [Online] Jul. 1, 1998, XP002403042 Retrieved from the Internet: http://www-128.1bm.com/developerworks/lotus/library/1s-Conversion_Services/index.html [Retreived on Oct. 13, 2006], p. 1-p. 5.
Hartmann, Eric. "uCan iCal with Exchange and Outlook" Internet Citation, [Online] Oct. 22, 2004, XP002403043 Retrieved from the Internet: http://msexchangeteam.com/archive/2004/10/22/246468.aspx [Retrieved on Oct. 13, 2006-10-13] p. 1-p. 6.
Dawson Lotus S Mansour Netscape S Silverberg Microsoft F. "iCalendar Message-Based Interoperability Protocol (1MIP)" IETFf Standard Engineering Task Force, IETF, CH, Nov. 1998, XP015008231 ISSN: 0000-0003 Paragraph [02.4]. Paragraph [04.2].
Canadian Intellectual Property Office, "Examiner's Requisition" for corresponding CA Patent Application No. 2,591,128 dated Jul. 6, 2011, Canada.

* cited by examiner

*Primary Examiner* — Tonia L M Dollinger
*Assistant Examiner* — Clarence John
(74) *Attorney, Agent, or Firm* — Norton Rose OR LLP

(57) ABSTRACT

A method for generating electronic meeting communications for multiple formats and a messaging server for adapted in accordance with the method. The method comprises: receiving on the messaging server a first electronic meeting communication having a first meeting component in a first format, the first meeting component including event information; determining a second meeting component in a second format different from the first format, the second meeting component including substantially the same event information as the first meeting component; and sending a second electronic meeting communication comprising at least the first and second meeting components from the messaging server to one or more recipient devices.

37 Claims, 9 Drawing Sheets

METHOD AND SYSTEM FOR GENERATING AND PROCESSING ELECTRONIC MEETING COMMUNICATIONS FOR MULTIPLE FORMATS

FIELD OF THE APPLICATION

This application relates generally to electronic meeting communications, and more particularly to a method and system for generating and processing electronic meeting communications for multiple formats.

BACKGROUND

Calendaring and scheduling programs enable users to manage events, schedule resources, and schedule meetings between multiple people. Difficulties may arise when meetings are to be scheduled between people who do not use or have access to the same calendaring and scheduling program. The situation may be further complicated when it is not known in advance what calendar client is being used by the recipient of a meeting communication (e.g. a meeting request or invitation). Further, meeting communication recipients may change calendaring and scheduling clients while meeting communications are still being exchanged between invitees, for example when a user switches between clients when switching user terminals (e.g. home and office).

Some calendar data exchange standards, such as the Internet Calendaring and Scheduling Core Object Specification (iCalendar) defined in RFC 2445, allow users to send meeting requests and tasks to another users through emails. The iCalendar standard defines a Multipurpose Internet Mail Extensions (MIME) message format for communicating meeting requests and responses. Recipients of an iCalendar email with supporting software can respond to the sender (originator) by return email by accepting the meeting request or by counter-proposing a meeting with a different date, time, place, etc. The iCalendar standard describes the format of calendar-based data, however it does not describe how to process and handle that data. Accordingly, other protocols and standards are typically needed to manage this data. For example, a related standard is iCalendar Transport-Independent Interoperability (iTIP) which defines a protocol for exchanging iCalendar objects for the purposes of group calendaring and scheduling between users. Another related standard is iCalendar Message-based Interoperability Protocol (iMIP) which defines a standard method for implementing iTIP on standard Internet email-based systems.

Many but not all calendaring and scheduling programs are compliant with the iCalendar standard. For example, some calendaring and scheduling programs use proprietary email message headers which are not compatible with the iCalendar standard such as Lotus Notes™ from IBM Corporation,.

Thus, there remains a need for an improved method and system for generating and processing electronic meeting communications that will be compatible with different calendaring and scheduling clients applications.

BRIEF DESCRIPTION OF THE DRAWINGS

It will be noted that throughout the appended drawings, like features are identified by like reference numerals.

DETAILED DESCRIPTION

Figure 1:
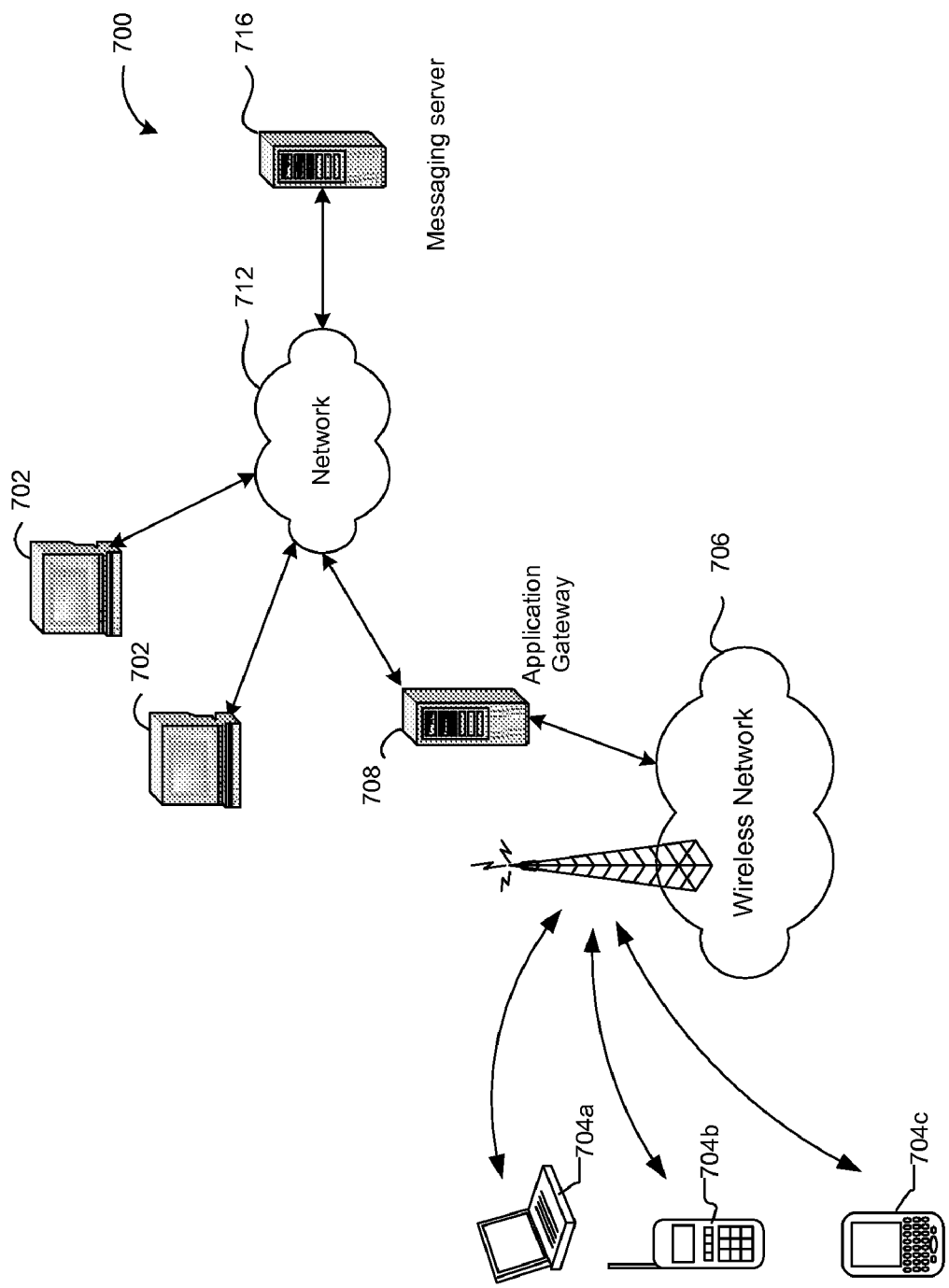
FIG. 1 is a schematic diagram of an exemplary system for sending and receiving electronic meeting communication in accordance with an embodiment of the application.

A method and system is described in which electronic (i.e. email) meeting communications having meeting components in two or more different formats are generated and processed to provide compatibility between clients, such as calendar clients in the two or more different formats or between calendar and email clients. In some embodiments, the electronic meeting communications are compatible with the iCalendar standard, one or more proprietary message header format(s), and normal email clients.

In accordance with one embodiment of the present application, there is provided a method for use on a messaging server for generating electronic meeting communications for multiple formats, the method comprising the steps of: receiving on the messaging server a first electronic meeting communication having a first meeting component in a first format, the first meeting component including event information; determining a second meeting component in a second format different from the first format, the second meeting component including substantially the same event information as the first meeting component; and sending a second electronic meeting communication comprising at least the first and second meeting components from the messaging server to one or more recipient client devices.

In accordance with another embodiment of the present application, there is provided a messaging server for generating electronic meeting communications for multiple formats, the messaging server being in communication with one or more client devices via a communications network, the messaging server comprising: a communication subsystem for sending and receiving electronic communications; a processor and memory, the memory including data and instructions to configure the processor to: receive on the messaging server a first electronic meeting communication having a first meeting component in a first format, the first meeting component including event information; determine a second meeting component in a second format different from the first format, the second meeting component including substantially the same event information as the first meeting component; and send a second electronic meeting communication comprising at least the first and second meeting components from the messaging server to one or more recipient client devices.

In accordance with further aspects of the present application, there is provided an apparatus such as a messaging server, a method for adapting this server, as well as articles of manufacture such as a pre-recorded storage device or other computer readable medium having program instructions recorded thereon for practising the method of the application, as well as a computer data signal carrying computer readable program instructions for practising the method of the application.

These and other aspects and features of the present application will become apparent to persons of ordinary skill in the art upon review of the following detailed description, taken in combination with the appended drawings.

FIG. 1 is a schematic diagram of an exemplary system 700 for sending and receiving electronic meeting communications in accordance with one embodiment of the application. The system 700 comprises client devices operatively connected to a messaging server 716 via a communications network 712 such as the Internet or a public or private network such as a local area network (LAN). The client devices may be wired computers or terminals 702 connected to the network 712, or wireless devices 704 connected to the network 712 via a wireless network 706 and application gateway 708. The client devices 702, 704 are provided with an email client and calendar client adapted to communicate with the messaging server 716. The email and calendar clients may be combined in a personal information manager (PIM) application having email-based calendaring and scheduling functions. The messaging server 716 routes and directs communications, including email messages and calendar events between the client devices 702, 704 connected to the communications network 712.

The application gateway 708 includes a communications interface or link to the wireless network 706 and a communications interface to the communications network 712. The application gateway 708 may also provide a firewall between the wireless network 706 and the communications network 712. The application gateway 708, sometimes referred to as a wireless gateway, interfaces and mediates communications between the wireless devices 704 connected to the wireless network 706 and the network services accessible through the communications network 712, such as the messaging server 716. The application gateway 708 includes protocol translators and other components necessary to provide system interoperability between the wireless network 706 and the communications network 712.

The application gateway 708 includes a message processing and transformation function that receives and processes messages from wireless devices 704 via the wireless network 706. The message processing and transformation function transforms the messages into a form readable by the communications network 712, if required. The processed messages are then forwarded to the respective network service, e.g. messaging server 716. The messages are then processed by the messaging server 716, and sent to the recipient client device 702, 704 via the communications network 712 or wireless network 706, as required. Where the recipient is a wireless device 704, the message is sent to the application gateway 708 via the communications network 712, where it is processed and transformed into a form readable by the wireless network 706, if required. The application gateway 708 then forwards the message to the recipient wireless device 704 via the wireless network 706.

It will be appreciated that the system 700 is provided for purposes of illustration only and is not intended to be limiting. In some embodiments, there may be more than one communications network 712 and messaging server 716, and that there may be more than one wireless network 706 and application gateway 708. The messaging servers 716 may be a Microsoft Exchange™ server, Lotus Domino™ server, or other suitable messaging server. Further, the system 700 may have a different network configuration than that shown in FIG. 1.

The wireless devices 704 may be any wireless communication device provided with an email and calendar client such as a PIM having email-based calendaring and scheduling functions/applications for sending email and calendar events. The wireless devices 704 may be, but are not limited to, wireless-enabled laptop computers 704a, mobile or cellular telephones with data messaging capabilities 704b, and personal digital assistants (PDAs) having wireless communication capabilities 704c. As described more fully below in connection with the exemplary wireless device of FIG. 7-9, the wireless devices 704 generally include a microprocessor connected to a radiofrequency (RF) section for wireless communications, a memory, and a user interface including a display and one or more user input devices, e.g. a keyboard, thumb-wheel, stylus, microphone, etc.

The messaging server 716 includes a conversion function/application 718. The conversion application 718 processes incoming electronic meeting communications and converts outgoing electronic meeting communications to ensure compatibility between calendar and/or email clients. The conversion application 718 processes the calendaring information of email meeting requests and responses (e.g. accept, decline, tentatively-accept, update or cancellation) in substantially the same manner and so can handle different types of electronic meeting communications. The conversion application 718 generates outgoing electronic meeting communications that are compatible (i.e. readable) with two or more electronic meeting communication formats used by calendar clients, email clients and/or PIMs selected from iCalendar compatible/complaint, proprietary message header type, and normal email. As will be appreciated by persons skilled in the art, the messaging server 716 also processes other items such as regular emails, tasks and other scheduling and calendaring events, and is not limited to processing electronic meeting communications.

Figure 5:
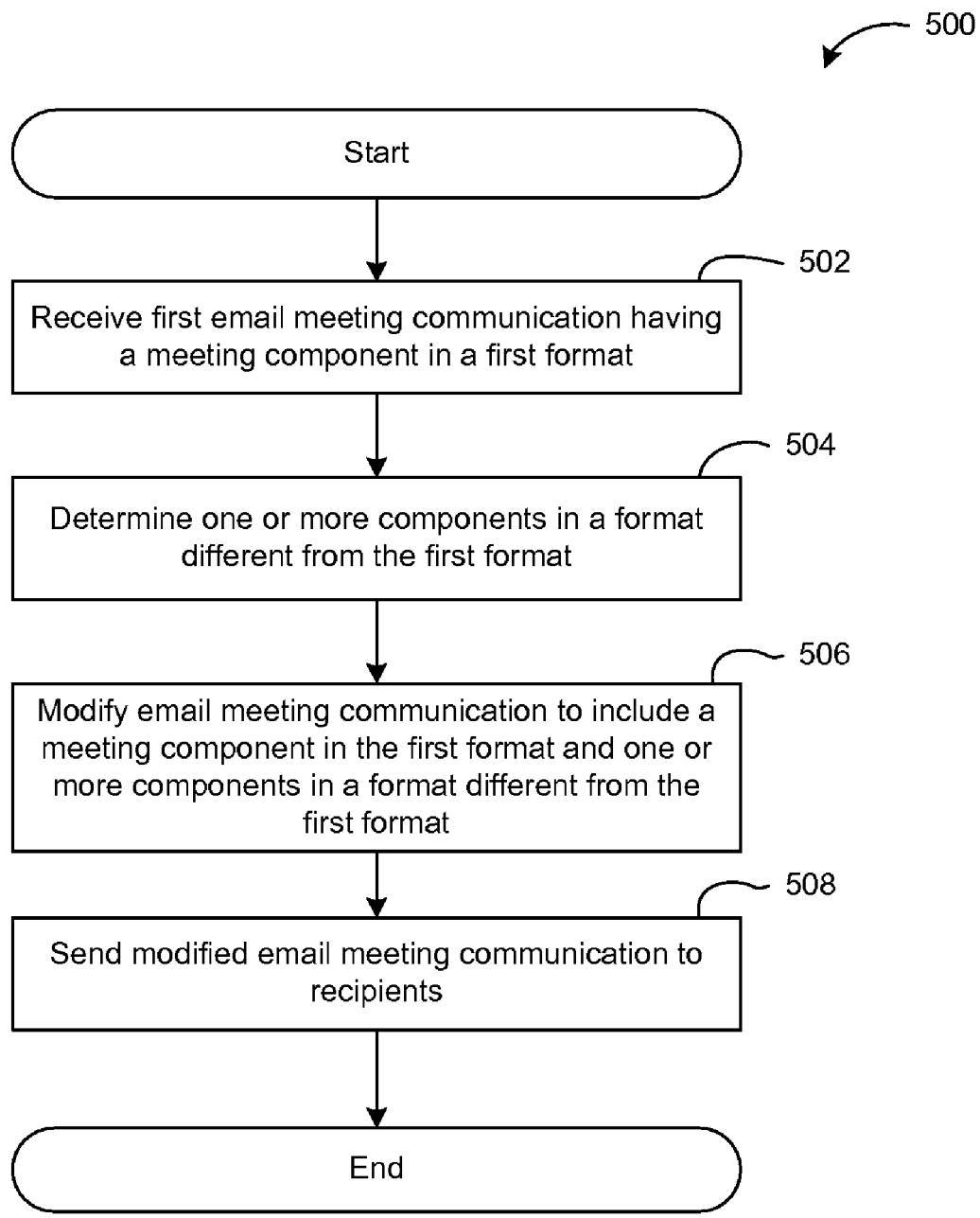
FIG. 5 is a flow chart of operations for generating electronic meeting communications in accordance with one embodiment of the application.

Referring to FIG. 5, exemplary operations 500 for generating an electronic meeting communication in accordance with one embodiment of the application will now be described. In the first step 502, a first electronic meeting communication (e.g. request/invitation, response, etc.) comprising a meeting component having calendaring/event information and data in a first format is received on the messaging server 716 from a client 102, 104. Next, in step 504, one or more corresponding meeting components containing the same or substantially the same calendaring/event information in a format different that the first format is determined by the conversion application 718. For example, according to some embodiments, if the first format is iCalendar, one or both of a proprietary message header component and text component is determined. The text component may be plain text, rich text, html etc. depending on the particular implementation of the system 700 and messaging server 716. In other embodiments, more than one proprietary message header component may be determined.

Next, in step 506, the electronic meeting communication is modified by adding the one or more meeting components in a format different from the first format into the electronic meeting communication. Typically, the one or more components in different formats are inserted in the first electronic meeting communication, however a new electronic meeting communication containing the component in the first format and the one or more meeting components in a format different from the first format may be generated if desired or required by the particular system configuration. The modified electronic meeting communication must be compliant with the MIME standard for formatting email. If necessary, the electronic meeting communication may undergo format modification after the insertion of the one or more meeting components in different formats, for example to ensure it is complaint with the MIME standard. Next, in step 508, the modified electronic meeting communication is sent by the messaging server 716 to one or more the recipient(s) as specified in the first electronic meeting communication received in step 502.

It will be appreciated that the formats recognized by the messaging server 716 and the one or more additional formats added to the first electronic meeting communication may vary between embodiments depending on the particular implementation of the system 700 and messaging server 716.

Figure 2A:
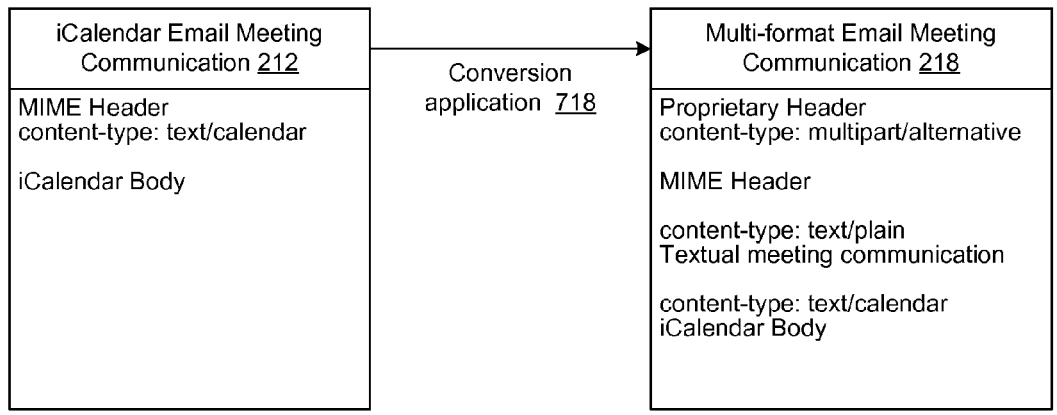
FIG. 2A is a schematic diagram illustrating the generation of exemplary electronic meeting communication in accordance with one embodiment of the application from an iCalendar electronic meeting communication.
Figure 2B:
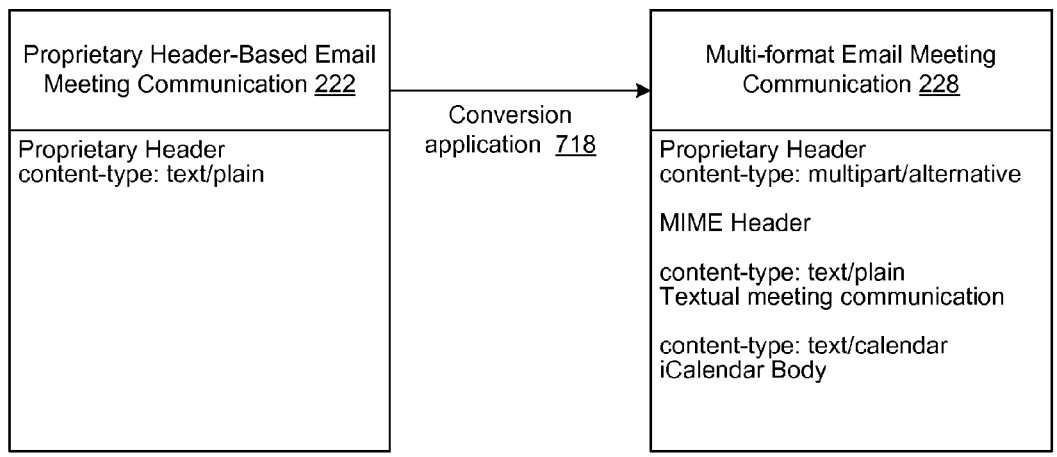
FIGS. 2B is a schematic diagram illustrating the generation of exemplary electronic meeting communication in accordance with one embodiment of the application from a proprietary message header based electronic meeting communication.
Figure 4:
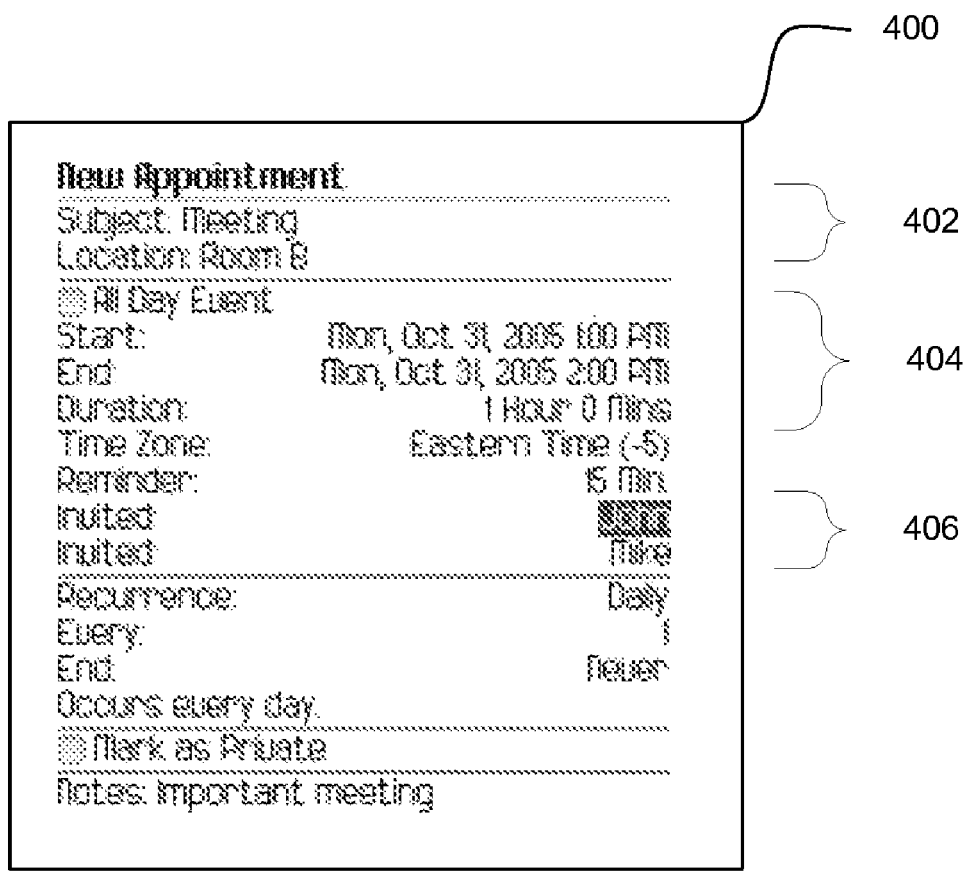
FIG. 4 is a screen capture of an exemplary meeting communication.

Referring to FIGS. 2A and 2B, the generation of exemplary electronic meeting communications in accordance with one embodiment of the application will be described. The electronic meeting communications are outgoing communications addressed to one or more specified recipients. The electronic meeting communications may be a meeting invitation or response (e.g. accept, decline, tentatively-accept, update or cancellation), or other electronic meeting communication. When the electronic meeting communication is not the initial electronic meeting communication, for example because it is a response, the specified recipients may be the same or different than that specified in the electronic meeting communication being responded to. For example, additional recipients may be added or some recipients may be removed. It is also possible that the electronic meeting communication may be modified, for example a user may add notes or comments when sending a response, or change dates or locations. In some embodiments, the ability to modify the event information may be limited to a meeting organizer. FIG. 4 shows an exemplary electronic meeting or appointment communication 400 presented on a client device, such as wireless device 704, comprising subject and location information fields 402, data and time information fields 404, and invitee information fields 406, as well as other fields. The format and content of suitable electronic meeting communications will be understood by a person of skill in the art. The exemplary electronic meeting communication 400 is provided for the purpose of illustration only and is not intended to be limiting.

Referring now to FIG. 2A, an electronic meeting communication 212 (e.g. invitation) having a meeting component in the iCalendar format is received by the messaging server 716 from a client 702 or 704. The conversion application 718, implemented on the messaging server 716, interprets the meeting communication 212 and determines a corresponding proprietary message header component and a text component for normal email clients, each having the same or substantially the same calendaring or event information as the meeting component in the iCalendar format. The proprietary message header component is of a predetermined proprietary message header format (e.g. Lotus Notes™ Release 5, etc.). The text component may be plain text, rich text, html etc. depending on the particular implementation of the system 700 and messaging server 716. The conversion application 718 then modifies the electronic meeting communication 212 by adding the proprietary message header component and text component to the electronic meeting communication.

As will be appreciated by persons of ordinary skill in the art, the iCalendar component, proprietary message header component, and text component each contain the same or substantially the same calendaring or event information for use by their respective recipient clients. Thus, the modified electronic meeting communication 214 includes an iCalendar component, a proprietary message header component, and a text component having the same or substantially the same calendaring information. The iCalendar component is compatible with the iCalendar standard such as, for example, RFC 2445, however the present application is not limited to a particular release or version of the iCalendar standard and can be adapted as changes are made to the standard.

After being modified by the messaging server 716, the modified electronic meeting communication 218 is sent by the messaging server 716 to the one or more recipients indicated by the sender in the electronic meeting communication 212. The modified electronic meeting communication 218 is received and interpreted by the messaging server 716 of the recipient(s) as described in more detail below in connection with FIGS. 3A to 3C.

Referring now to FIG. 2B, an electronic meeting communication 222 having a meeting component in a proprietary message header format is received by the messaging server 716. The conversion application 718, implemented on the messaging server 716, interprets it and determines a corresponding iCalendar component compatible with the iCalendar standard, for example compliant with RFC 2445, and a text component for normal email clients, each having the same or substantially the same calendaring or event information as the meeting component in the proprietary message header format. The conversion application 718 then modifies the electronic meeting communication 222 by adding the iCalendar component and the text component.

Thus, similar to the method described above in connection with FIG. 2A, the modified electronic meeting communication 228 includes an iCalendar component, a proprietary message header component, and a text component having the same or substantially the same calendar or event information. The modified electronic meeting communication 228 is sent by the messaging server 716 to the one or more recipients indicated by the sender in the electronic meeting communication 222.

It will be appreciated that in the foregoing examples illustrated in FIGS. 2A and 2B, the proprietary message header of the communication 222 has a MIME content-type of "text/plain". This content-type is given for illustration only because proprietary message headers are often of this type, and in other embodiments the content-type of the proprietary message header may be different than "text/plain". It is also possible that the electronic meeting communications 212 and/or 222 may themselves have an alternative text component (not shown) in case the recipient client does not understand the given calendar format. In such cases, the messaging server 716 uses one of the included calendar formats, typically the format from which it can extract the most calendaring/event information, from which to determine the one or more additional meeting components to be added to the electronic meeting communications 212 and/or 222.

The modified electronic meeting communications 218, 228, generated by the messaging server 716 are complaint with the MIME Internet standard for the format of email, such as that defined by the following Request for Comments (RFC) documents: RFC 2045: MIME Part One: Format of Internet Message Bodies, RFC 2046: MIME Part Two: Media Types, RFC 2047: MIME Part Three: Message Header Extensions for Non-ASCII Text, RFC 2048: MIME Part Four: Registration Procedures, and RFC 2049: MIME Part Five: Conformance Criteria and Examples. However, it will be appreciated that the present application is not limited to any particular version of the MIME standard, and that the present application is intended to cover any and all versions, revisions and updates for the MIME Internet standard for the format of email.

As will be understood by persons skilled in the art, the MIME standard defines a series of e-mail headers for specifying attributes of an email message including the "content-type" header field (which indicates the type and subtype of the message content) and defines a set of transfer encodings, amongst many parameters for formatting email. However, the MIME standard is extensible and includes a method to register new content types and other MIME attribute values. All MIME message attributes are optional with default values making a non-MIME message likely to be interpreted correctly by a MIME-capable email client. In addition, a MIME text message is likely to be interpreted correctly by a non-MIME client although it will include message headers the non-MIME email clients do not know how to interpret.

As will be described in more detail below, according to a preferred embodiment of the present application the modified electronic meeting communications 218, 228 are multipart emails readable by iCalendar compliant/compatible calendar clients and PIMs, proprietary message header clients and PIMs, and normal email clients without calendaring and scheduling capabilities.

The "multipart" message type allows MIME complaint messages to have multiple parts arranged in a tree structure where the leaf nodes are any non-multipart content type and the non-leaf nodes are any of a variety of multipart types. In some embodiments of the application, the use of a "global" or overall MIME content-type for the modified electronic meeting communication of "multipart/alternative" allows calendaring and event data to be represented in multiple formats. As will be understood by persons skilled in the art, the MIME "multipart/alternative" content-type header includes a boundary placed between the message body parts, at the beginning of the body of the message, and at end of the body of the message. The boundary must not occur in any of the message parts. An example email of the "multipart/alternative" type in accordance with one embodiment of the application is given below.

The proprietary message header is syntactically MIME-compliant, however the MIME standard does not define a meaning for these headers. Only the messaging server 716 and compatible proprietary message header-based calendar and/or PIM clients can determine what the respective proprietary message header components semantically mean. The messaging server 716 uses this information to determine and generate meeting completes having the same or substantially the same information in other formats, whereas compatible with proprietary message header recipient clients process such electronic meeting communications.

Preferably, the body parts (i.e. message components in respective formats) are in increasing order of preference, i.e. the preferred format appears last in the electronic meeting communication generated by the method of the present application. The text component is preferably located in the email message before the iCalendar format, and the proprietary message header format preferably appears before both the text component and iCalendar component. Typically, recipient clients are configured to select the last format in a multipart message that they are capable of using. It may be the recipient client may recognize more than one of the formats. In such cases, the preferred format (i.e. the last placed format the client is capable of using) will typically be selected, however the recipient client may offer the user the choice of which format to use. It will be appreciated that one of the alternatives may itself be of type "multipart", in which case the same rules apply as for the main message body parts.

The proprietary message header components of the electronic meeting communications 218, 228 are readable by the compatible proprietary message header calendaring and scheduling clients and PIMs. If more than one proprietary message header calendaring and scheduling client is to be supported, than the conversion application 718 implemented by the messaging server 716 will be configured to add the appropriate proprietary message header components for inclusion in the outgoing, modified electronic meeting communication as required. Because the conversion application 718 does not know what proprietary message header formats will be in use by the recipient calendar client, where more than one proprietary header systems may be in use by a recipient, the conversion application 718 is configured to include all possible proprietary message header components of the supported formats in the outgoing communication.

Shown below is an exemplary modified electronic meeting communication (in this case a meeting "invitation" or request as indicated by the field "x-notes-item: I; name=noticetype") in accordance with one embodiment of the application that is compatible with iCalendar clients, Lotus Notes™ Release 5 clients, and normal email clients. As would be understood by a person of ordinary skill in the art, meeting responses and response (e.g. accept, decline, tentatively-accept, update or cancellation) and other meeting events may be processed in a similar manner.

x-notes-item: 07/10/2005 11:00 PM GMT; name=startdatetime
x-notes-item: 07/10/2005 11:30 PM GMT; name=enddatetime
x-notes-item: test002@test.rim.net; name=chair
x-notes-item: 040000008200E00074C5B7asldf0000000aBB; name=apptunid
x-notes-item: I; name=noticetype
x-notes-item: summary_of_event; name=topic
x-notes-item: there; name=location
x-notes-item: mlam@rim.com; name=requiredattendees
Mime-Version: 1.0
Content-Type: multipart/alternative;boundary="abcde"
Subject: summary_of_event
--abcde
Content-Type: text/plain
Summary: summary_of_event
Begin: 11:00 pm 7th October 2005 UTC
End: 11:30 pm 7th October 2005 UTC
Location: there
description_of_event
--abcde
Content-Type: text/calendar; method=REQUEST; name="meeting.ics"
BEGIN:VCALENDAR
METHOD:REQUEST
PRODID:BWCCALENDAR
VERSION:2.0
BEGIN:VEVENT
DTSTAMP:20051005T205506Z
DTSTART:20051007T230000Z
SUMMARY:summary_of_event UID: 040000008200E00074C5B7asldf0000000aBB ATTENDEE;ROLE=REQ-PARTICIPANT;
PARTSTAT=NEEDS-ACTION;RSVP=TRUE;
CN="Michael Lam":MAILTO :mlam@rim.com
 ORGANIZER;CN="Test":MAILTO:
test002@test.rim.net
  LOCATION:there
  DTEND:20051007T233000Z
  DESCRIPTION:description_of_event
  SEQUENCE:0
  PRIORITY:5
  CLASS:
  CREATED:20051005T205506Z
  LAST-MODIFIED:20051005T205506Z
  STATUS:CONFIRMED
  TRANSP:OPAQUE
  BEGIN:VALARM
  ACTION:DISPLAY
  DESCRIPTION:REMINDER
  TRIGGER;RELATED=START:-PT00H15M00S
  END:VALARM
  END:VEVENT
  END:VCALENDAR
--abcde--

Figure 6:
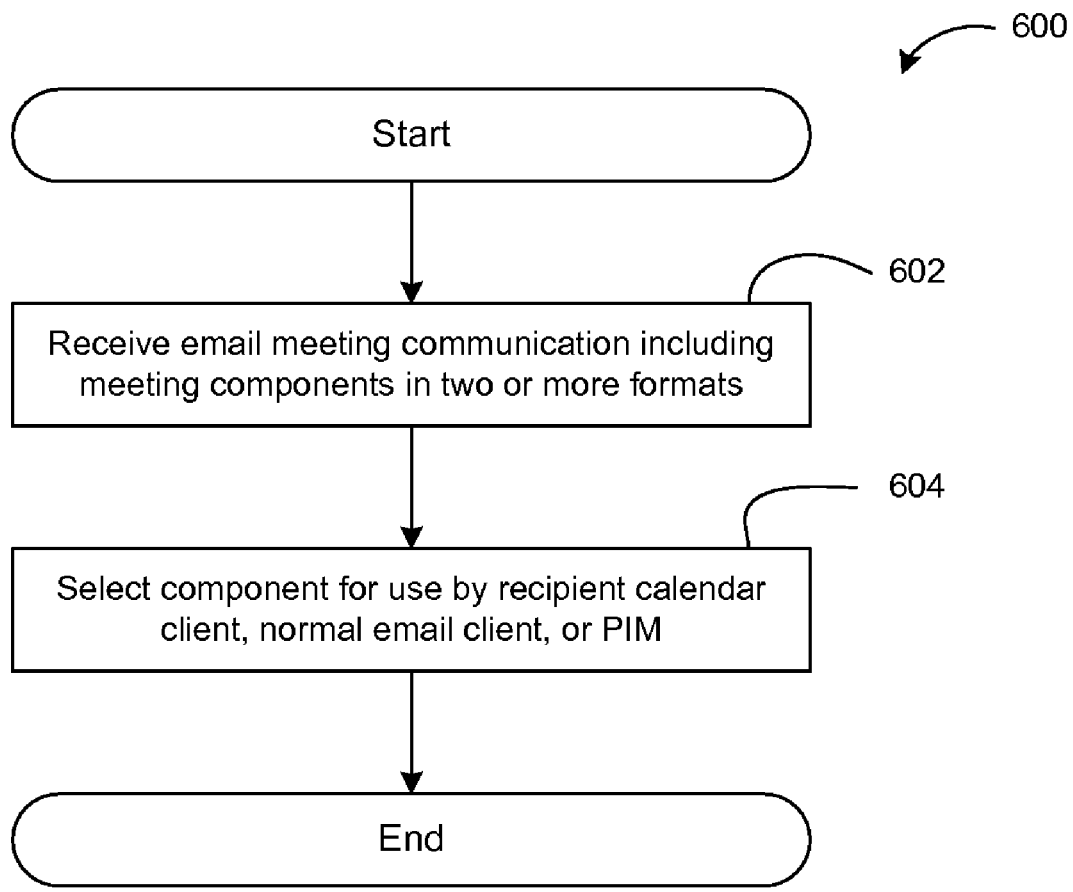
FIG. 6 is a flow chart of operations for processing electronic meeting communications in accordance with one embodiment of the application.

Referring now to FIG. 6, exemplary operations 600 for processing an electronic meeting communication in accordance with one embodiment of the application will now be described. In the first step 602, an electronic meeting communication (e.g. request/invitation, response, etc.) including meeting components in two or more formats is received by a normal email client, calendar client or PIM running on the device 702, 704..

Next, in step 604, the normal email client, calendar client or PIM selects one of the meeting components for use according to its recognized or preferred format. For example, if the electronic meeting communication includes an iCalendar component, a proprietary message header component, and a text component readable by normal email clients, where the recipient client is iCalendar compliant/compatible, the iCalendar component will typically be selected. If the recipient client can read or recognize more than one of the formats, than the recipient client will typically select the preferred format or the format it is most compatible with (e.g., the format the most information can be extracted from or which, etc.), or alternatively a user of the device 702, 704 on which the recipient client resides may be given the choice of selecting which format to use. Advantageously, the electronic meeting communication is provided with two or more meeting components having substantially the same calendar or event information in several formats allowing the recipient client to select a format that it is compatible amongst the multiple formats, and in some cases allows the receipt client to select the format it is most compatible with amongst the multiple formats. Next, the recipient normal email client, calendar client or PIM interprets and processes the selected meeting component in the usual way.

Figure 3A:
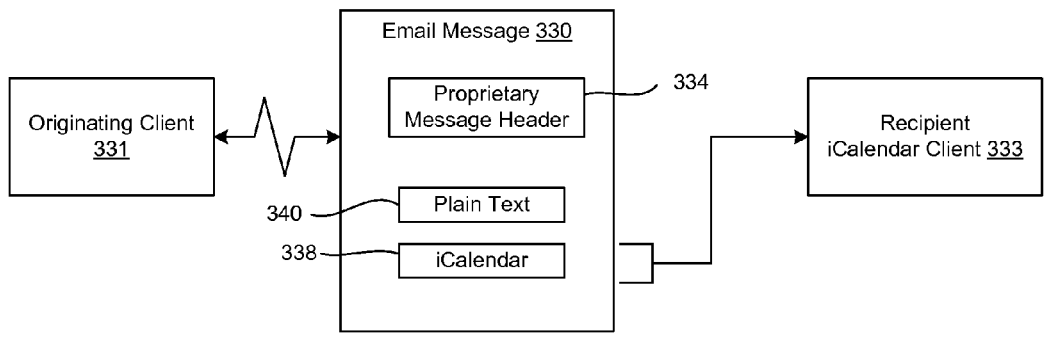
FIGS. 3A-C are schematic diagrams illustrating the processing of exemplary electronic meeting communications in accordance with one embodiment of the application.
Figure 3B:
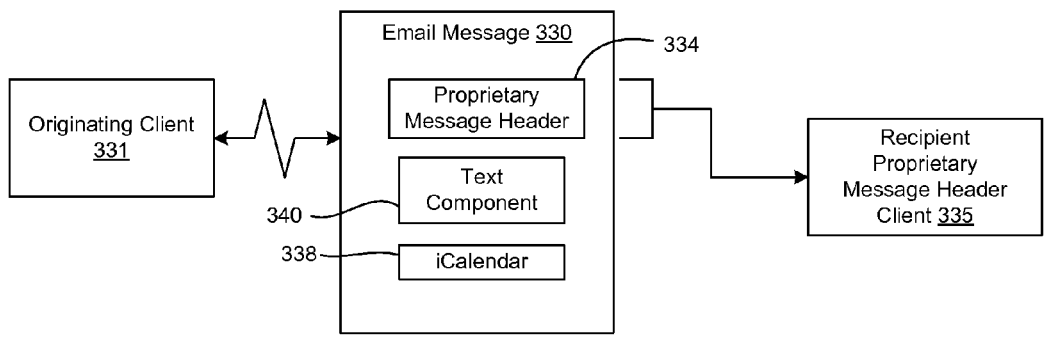
Figure 3C:
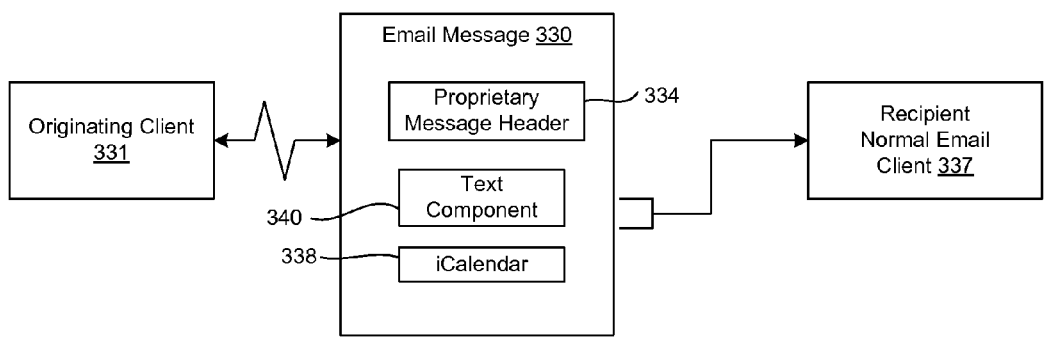

Referring now to FIGS. 3A-C, the processing of exemplary electronic meeting communications for multiple formats in accordance with one embodiment of the application will be described. FIG. 3A shows the processing of an electronic meeting communication such as an email message 330 by a recipient iCalendar compliant/compatible client 333. The electronic meeting communication 330 is generated according to the method for generating electronic meeting communications for multiple formats described above and received from an originating client 331. The electronic meeting communication 330 comprises a proprietary message header component 334, an iCalendar component 338 complaint with the iCalendar standard such as that defined in RFC 2445, and a text component 340 readable by normal email clients, and is complaint with the MIME standard for email.

The iCalendar client 333 interprets the electronic meeting communication 330, and selects and extracts the iCalendar component 338 using the MIME content-type header field information and message attributes. In the example message, the iCalendar competent 338 is identified by the content type "text/calendar". Accordingly, only calendar clients will select this component, and then only calendar clients that can understand the given format, i.e. the iCalendar standard. Next, the iCalendar component 338 is interpreted and processed by the iCalendar client 333 in the usual manner.

FIG. 3B shows the processing of the electronic meeting communication 330 by a recipient proprietary message header calendaring/scheduling client 335 such as, for example, Lotus Notes™ Release 5. The proprietary message header calendar client 335 interprets the electronic meeting communication 330, and selects and extracts the proprietary message header component 334. Next, the proprietary message header component 334 is interpreted and processed by the client 335 in the usual manner. As discussed above, the proprietary message header component 334, though defined syntactically in accordance with MIME, is readable only by compatible proprietary message header calendaring/scheduling clients and PIMs. Compatible clients and PIMs, recognize this a preferred format or the only readable format, will select the proprietary message header component 334 and disregard the iCalendar and text components 338 and 340. For non-compatible clients, the proprietary message header component 334 uses custom header fields that will not be understood and so be discarded by clients that do not understand them, i.e. iCalendar clients 333 and normal email clients 337.

FIG. 3C shows the processing of the electronic meeting communication 330 by a normal email client 337 without calendaring and scheduling capabilities. A "normal" email client is a MIME-compliant email client without calendaring and scheduling capabilities. The normal email client 337 interprets the electronic meeting communication 330, and selects and extracts the text component 340 using the MIME content-type header field information and message attributes. In the example message, the text competent 340 is provided under the content type "text/plain" although the text component may be in rich plain text, rich text, html etc. depending on the particular implementation of the system 700 and messaging server 716. Normal email clients 337 will select the text component 340 using the MIME content-type header field information and message attributes because they cannot understand the proprietary message header component 334 or iCalendar component 338.

Next, the text component 340 334 is interpreted and processed by the normal email client 337. Because the normal email client 337 does not have calendaring and scheduling capabilities, it is not automatically processed as with iCalendar clients 333 and recipient proprietary message header clients 335. Instead, the calendaring and event information will be included in the body of the email. A user of the normal email client 337 may respond to the electronic meeting communication 330 by responding to the email in the usual way. With normal email clients 337, meeting requests and responses are carried in the body of the email. The normal email client 337 may be configured so that the reply message incorporates the contents of the original email message. By indicating "accept" or "decline" in the reply message, for example in the email subject line or message body, primitive calendaring and scheduling information may be exchanged between the recipient and sender/originator of the electronic meeting communication 330. The recipient may also counter-propose with a different date, time, etc. by changing the event information in the reply message and indicating "counterproposal", etc.

In accordance with another embodiment of the present application, there is provided a method for use on a messaging server for generating electronic meeting communications for multiple formats, the method comprising the steps of: receiving on the messaging server a first electronic meeting communication having a first meeting component in a first format and a second meeting component in a second format different from the first format, the first and second meeting component including at least some common event information; and determining one or more additional meeting components in one or more additional formats different from the first and second formats, the one or more additional meeting components including at least the at least some common event information of the first and second meeting components; and sending a second electronic meeting communication comprising at least the first meeting component, second meeting component, and one or more additional meeting components from the messaging server to one or more recipient client devices. In some embodiments, the first and second meeting component may be an iCalendar component and text component respectively, and the one or more additional components may be one or more proprietary message header components. In other embodiments, the first and second meeting components may be a proprietary message header component and text component respectively, and the one or more additional components may be an iCalendar component. The method may further comprise inserting the one or more additional components into the first electronic meeting communication received on the messaging server, and may comprise, after the inserting, one of formatting or reformatting the electronic meeting communication in accordance with the Multipurpose Internet Mail Extensions (MIME) standard for email. The meeting components may be arranged in increasing order of preference. The proprietary message header format may be compatible with one or more Lotus Notes proprietary message header formats. The message components in the second electronic meeting communication may comprise a proprietary message header component positioned at the beginning of the second electronic meeting communication, a text component positioned within the second electronic meeting communication after the proprietary message header component, and an iCalendar component positioned within the second electronic meeting communication after the text component. The second electronic meeting communication may have a global content-type of multipart/alternative. The second electronic meeting communication may be an email message.

Figure 7:
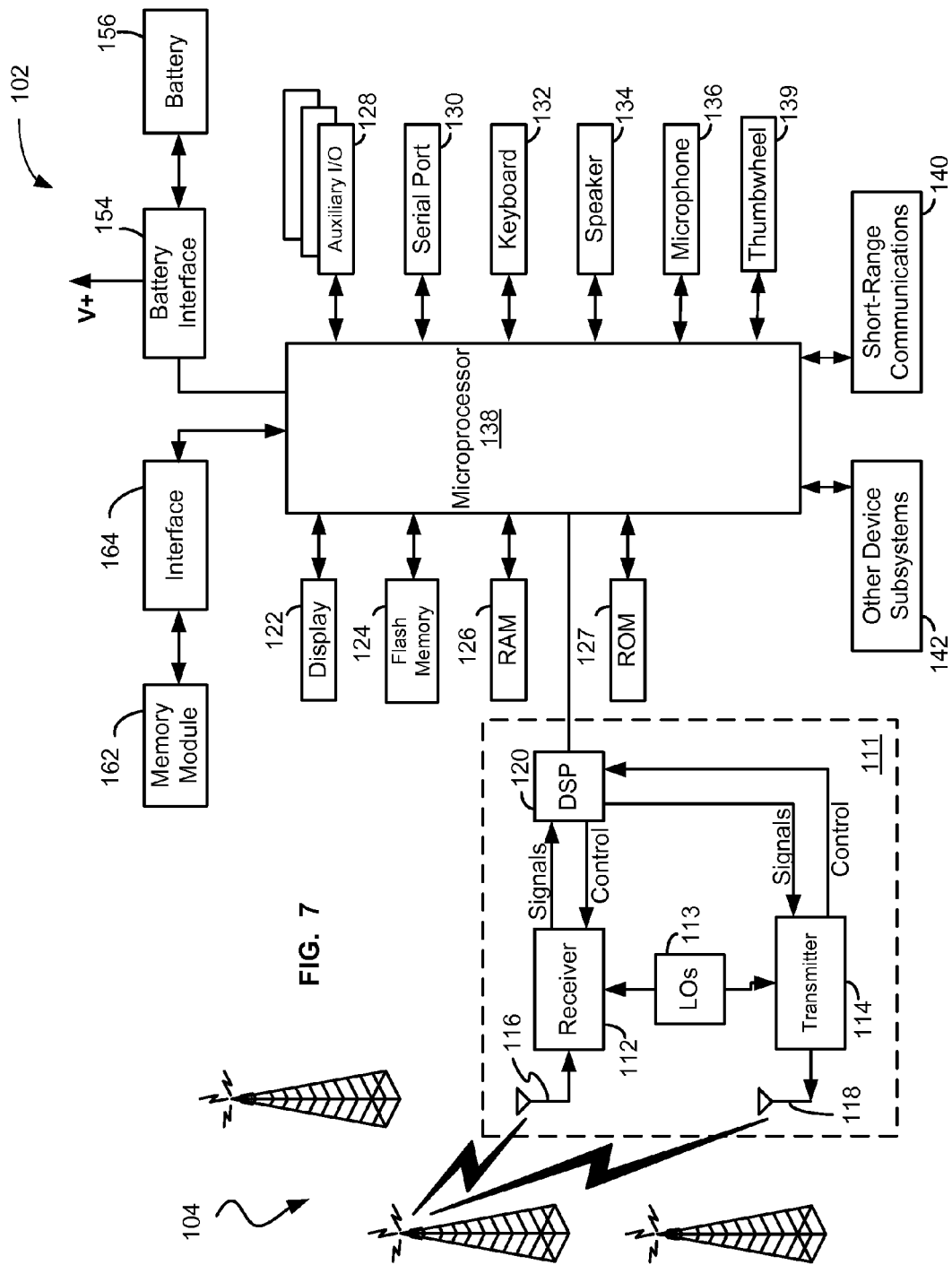
FIG. 7 is a block diagram illustrating an exemplary wireless device connected to a wireless network suitable for use in the system of FIG. 1.

FIG. 7 is a block diagram illustrating an exemplary wireless communications device 102 for use with the system 700 in accordance with one embodiment of the present application. The wireless device 102 communicates through a wireless communication network 104. The wireless network 104 includes antenna, base stations, and supporting radio equipment as for supporting wireless communications between the wireless device 102 and other devices connected to wireless network 104. The wireless network 104 may be coupled to a wireless network gateway (not shown) and to a wide area network (not shown).

The wireless device 102 is preferably a two-way communication device having at least voice and advanced data communication capabilities, including the capability to communicate with other computer systems. Typically, the wireless device 102 is a handheld device. Depending on the functionality provided by the wireless device 102, it may be referred to as a data messaging device, a two-way pager, a cellular telephone with data messaging capabilities, a wireless Internet appliance, or a data communication device (with or without telephony capabilities). The wireless device 102 may communicate with any one of a plurality of fixed transceiver stations within its geographic coverage area.

The wireless device 102 will normally incorporate a communication subsystem 111, which includes a receiver 112, a transmitter 114, and associated components, such as one or more (preferably embedded or internal) antenna elements 116 and 118, local oscillators (LOs) 113, and a processing module such as a digital signal processor (DSP) 120. As will be apparent to those skilled in field of communications, the particular design of the communication subsystem 111 depends on the wireless network 104 in which wireless device 102 is intended to operate.

The wireless device 102 may send and receive communication signals over the wireless network 104 after the required network registration or activation procedures have been completed. Signals received by the antenna 116 through the wireless network 104 are input to the receiver 112, which may perform such common receiver functions as signal amplification, frequency down conversion, filtering, channel selection, and the like, and analog-to-digital (A/D) conversion. A/D conversion of a received signal allows more complex communication functions such as demodulation and decoding to be performed in the DSP 120. In a similar manner, signals to be transmitted are processed, including modulation and encoding, for example, by DSP 120. These DSP-processed signals are input to the transmitter 114 for digital-to-analog (D/A) conversion, frequency up conversion, filtering, amplification and transmission over the wireless network 104 via the antenna 118. The DSP 120 not only processes communication signals, but also provides for receiver and transmitter control. For example, the gains applied to communication signals in the receiver 112 and the transmitter 114 may be adaptively controlled through automatic gain control algorithms implemented in the DSP 120.

Network access is associated with a subscriber or user of the wireless device 102, and therefore the wireless device 102 requires a memory module 162, such as a Subscriber Identity Module (SIM) card or a Removable User Identity Module (R-UIM), to be inserted in or connected to an interface 164 of the wireless device 102 in order to operate in the wireless network 104. Alternatively, the memory module 162 may be a non-volatile memory which is programmed with configuration data by a service provider so that the wireless device 102 may operate in the wireless network 104. Since the wireless device 102 is a mobile battery-powered device, it also includes a battery interface 154 for receiving one or more rechargeable batteries 156. The battery 156 provides electrical power to most, if not all, electrical circuitry in the wireless device 102, and the battery interface 154 provides a mechanical and electrical connection for it. The battery interface 154 is coupled to a regulator (not shown) which provides power V+ to the circuitry of the wireless device 102.

The wireless device 102 includes a microprocessor 138 which controls the overall operation of the wireless device 102. Communication functions, including at least data and voice communications, are performed through communication subsystem 111. The microprocessor 138 also interacts with additional device subsystems such as a display 122, a flash memory 124, a random access memory (RAM) 126, a read-only access memory (ROM) 127, auxiliary input/output (I/O) subsystems 128, a data port such as serial port 130, a keyboard or keypad 132, a speaker 134, a microphone 136, a clickable thumbwheel or trackwheel 139, a short-range communications subsystem 140, and any other device subsystems generally designated at 142. Some of the subsystems shown in FIG. 7 perform communication-related functions, whereas other subsystems may provide "resident" or on-device functions. Notably, some subsystems, such as keypad 132, display 122, and clickable thumbwheel 139, for example, may be used for both communication-related functions, such as entering a text message for transmission over the wireless network 104, and device-resident functions such as a calculator or task list. Operating system software used by the microprocessor 138 is preferably stored in a persistent store such as flash memory 124, which may alternatively be ROM 127 or similar storage element. Those skilled in the art will appreciate that the operating system, specific device applications, or parts thereof, may be temporarily loaded into a volatile store such as RAM 126.

The microprocessor 138, in addition to its operating system functions, preferably enables execution of software applications on the wireless device 102. A predetermined set of applications which control basic device operations, including at least data and voice communication applications, will normally be installed on the wireless device 102 during its manufacture. The wireless device 102 includes a personal information manager (PIM) application having the ability to organize and manage data items relating to user such as, but not limited to, instant messaging, email, calendar events, voice mails, appointments, and task items. Naturally, one or more memory stores are available on the wireless device 102 and the memory module 162 to facilitate storage of PIM data items and other information.

The PIM application has the ability to send and receive data items via the wireless network 104. In one embodiment, PIM data items are seamlessly combined, synchronized, and updated via the wireless network 104, with the wireless device user's corresponding data items stored and/or associated with a host computer system thereby creating a mirrored host computer on the wireless device 102 with respect to such items. This is especially advantageous where the host computer system is the wireless device user's office computer system. Additional applications may also be loaded onto the wireless device 102 through the wireless network 104, the auxiliary I/O subsystem 128, the serial port 130, the short-range communications subsystem 140, or any other suitable subsystem 142, and installed by a user in RAM 126 or preferably a non-volatile store (not shown) for execution by the microprocessor 138. Such flexibility in application installation increases the functionality of the wireless device 102 and may provide enhanced on-device functions, communication-related functions, or both. For example, secure communication applications may enable electronic commerce functions and other such financial transactions to be performed using the wireless device 102.

In a data communication mode, a received signal such as a text message, an email message, or Web page download will be processed by the communication subsystem 111 and input to the microprocessor 138. The microprocessor 138 will preferably further process the signal for output to the display 122 or alternatively to the auxiliary I/O device 128. A user of the wireless device 102 may also compose data items, such as email messages, for example, using the keypad 132 and the clickable thumbwheel 139 in conjunction with the display 122 and possibly the auxiliary I/O device 128. The keypad 132 is preferably a complete alphanumeric keypad and/or telephone-type keypad. These composed items may be transmitted over the wireless network 104 through the communication subsystem 111 or the short range communication subsystem 140.

For voice communications, the overall operation of the wireless device 102 is substantially similar, except that the received signals would be output to the speaker 134 and signals for transmission would be generated by the microphone 136. Alternative voice or audio I/O subsystems, such as a voice message recording subsystem, may also be implemented on the wireless device 102. Although voice or audio signal output is preferably accomplished primarily through the speaker 134, the display 122 may also be used to provide an indication of the identity of a calling party, duration of a voice call, or other voice call related information.

The serial port 130 is normally implemented in a personal digital assistant (PDA)-type communication device for which synchronization with a user's desktop computer is a desirable, albeit optional, component. The serial port 130 enables a user to set preferences through an external device or software application and extends the capabilities of the wireless device 102 by providing for information or software downloads to the wireless device 102 other than through the wireless network 104. The alternate download path may, for example, be used to load an encryption key onto the wireless device 102 through a direct and thus reliable and trusted connection to thereby provide secure device communication.

The short-range communications subsystem 140 is an additional optional component which provides for communication between the wireless device 102 and different systems or devices, which need not necessarily be similar devices. For example, the subsystem 140 may include an infrared device and associated circuits and components, or a Bluetooth™ communication module to provide for communication with similarly-enabled systems and devices (Bluetooth™ is a registered trademark of Bluetooth SIG, Inc.).

Figure 8:
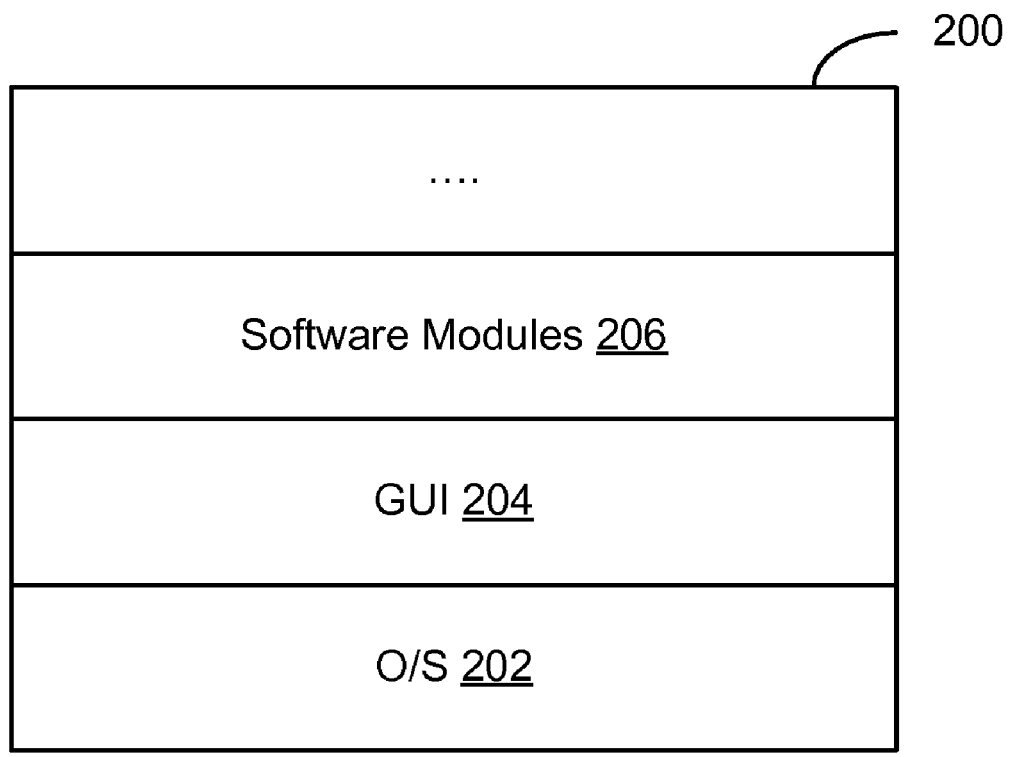
FIG. 8 is a block diagram illustrating a memory of the wireless device of FIG. 7.

FIG. 8 is a block diagram illustrating a memory 200 of the wireless device 102. The memory 200 has various software components for controlling the wireless device 102 and may include, for example, flash memory 124, RAM 126 and/or ROM 127. In accordance with one embodiment, the wireless device 102 is intended to be a multi-tasking wireless communications device configured for sending and receiving data items and for making and receiving voice calls. To provide a user-friendly environment to control the operation of the wireless device 102, an operating system 202 resident on the wireless device 102 provides a basic set of operations for supporting various applications typically operable through a graphical user interface (GUI) 204. For example, the operating system 202 provides basic input/output system features to obtain input from the auxiliary I/O 128, keypad 132, clickable thumbwheel 139, and other input devices, and to facilitate output to the user via the display 122. One or more software modules 206 for managing communications or providing a personal digital assistant (PDA) or other functions may also be included. The memory 200 also includes an email and calendar client, which may be combined in, for example, a PIM application having email-based calendaring and scheduling functions.

Thus, the wireless device 102 includes computer executable programmed instructions for directing the wireless device 102 to implement various applications. The programmed instructions may be embodied in one or more software modules 206 resident in the memory 200 of the wireless device 102. Alternatively, the programmed instructions may be embodied on a computer readable medium (such as a DVD, CD, floppy disk or other storage media) which may be used for transporting the programmed instructions to the memory 200 of the wireless device 102. Alternatively, the programmed instructions may be embedded in a computer-readable, signal-bearing medium that is uploaded to the wireless network 104 by a vendor or supplier of the programmed instructions, and this signal-bearing medium may be downloaded through one or more of the interfaces 111, 130, 140 to the wireless device 102 from the wireless network 104 by end users.

Figure 9:
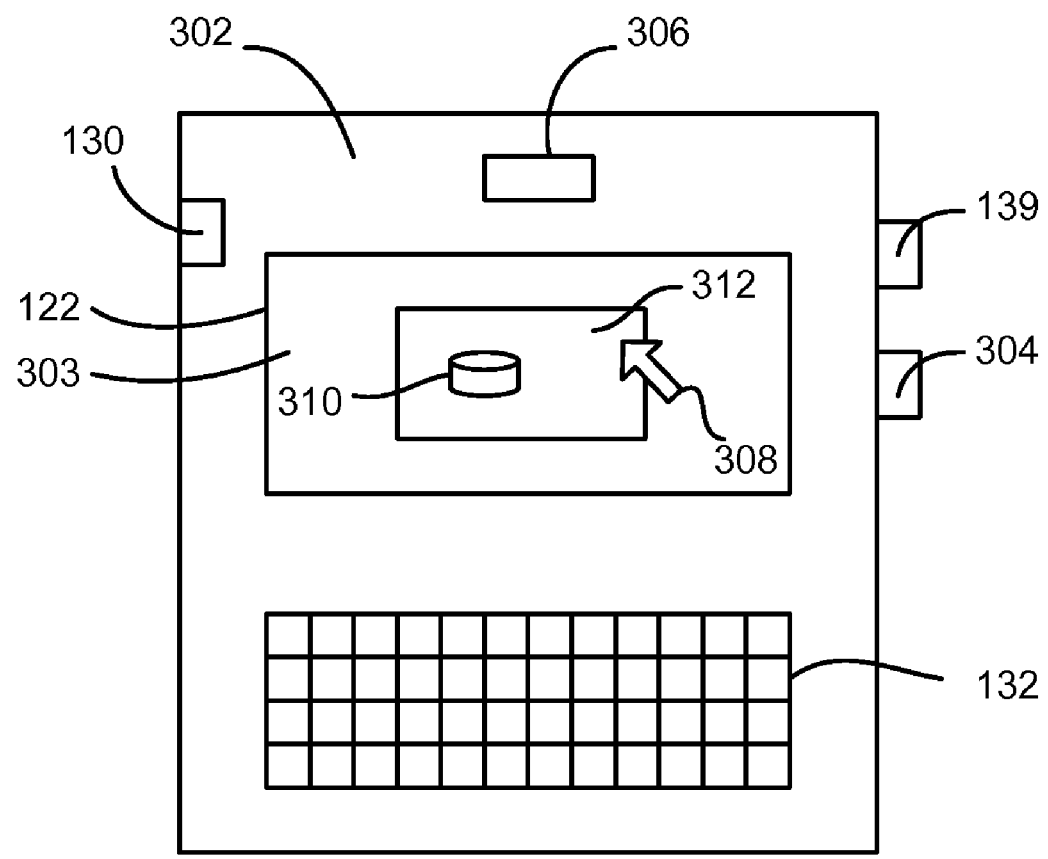
FIG. 9 is a front view illustrating the wireless device of FIG. 7.

FIG. 9 is a front view of the wireless device 102. As mentioned above, the wireless device 102 may be a data and voice-enabled handheld device. The wireless device 102 includes a casing 302, data or serial port 130, display screen 122, graphical user interface (GUI) 303, keypad 132, clickable thumbwheel 139, one or more input buttons 304 (e.g. select, cancel buttons), and signal inputs/outputs 306 (e.g., power connector input, microphone, speaker, data interface input, etc.). Internally, the wireless device 102 includes one or more circuit boards, a microprocessor 138, a memory 200, a battery 156, an antenna 116, 118, etc., which are coupled to the signal inputs/outputs 306, keypad 132, display screen 122, clickable thumbwheel 139, etc.

The microprocessor 138 is typically coupled to one or more input devices (e.g. buttons 304, keypad 132, clickable thumbwheel 139) for receiving user commands or queries and the display 122 for displaying the results of these commands or queries. For example, user queries may be transformed into a combination of commands for producing one or more tables of output data which may be incorporated in one or more display pages for presentation to the user. The microprocessor 138 is also coupled to the memory 200 containing the software modules 206 and data such as database tables.

A user may interact with the wireless device 102 and its software modules 206 using the GUI 303. The GUI 303 is supported by the operating system 202 and provides a display format enabling the user to choose commands, execute application programs, manage computer files, and perform other functions by selecting pictorial representations known as icons, or selecting items from a menu through the use of an input or pointing device such as a clickable thumbwheel 139 and/or keypad 132. Generally, the GUI 303 is used to convey information and receive commands from users, and generally includes a variety of GUI objects or controls including icons, toolbars, drop-down menus, pop-up menus, text, dialog boxes, buttons, and the like. A user typically interacts with the GUI 303 presented on the display 122 by using the input or pointing device to position a pointer or cursor 308 over an object 310 (i.e., "pointing" at the object) and by "clicking" on the object 310. (e.g., by depressing the thumbwheel 139 or a button on the keyboard 132, etc.). This is often referred to as a point-and-click operation or a selection operation. Typically, the object 310 may be highlighted (e.g., shaded) when it is selected or pointed at by the pointer or cursor 308.

Typically, a GUI-based system presents application, status, and other information to the user in windows appearing on the display 122. A window 312 is a display area within the display 122, typically rectangular, in which a user may view an application or document. A window 312 may be open, closed, displayed full screen, reduced to an icon, increased or reduced in size, or moved to different areas of the display 122. Multiple windows 312 may be displayed simultaneously. For example, windows 312 may be displayed within other windows, overlapped other windows, or tiled within the display area.

Although the method and system of the present application has been explained with reference to exemplary calendar formats such as iCalendar and various proprietary header-based calendar formats, it will appreciated that the present application is not limited to any particular calendar format discussed herein. Furthermore, although the method and system of the present application have been explained with reference to exemplary MIME compliant/compatible electronic meeting communications, it will be appreciated that the application is not limited to any particular version of MIME. Further, although electronic (e.g. email) meeting communications have been described in connection with calendar events such as meetings, the method of the present application may also be adapted to work with other events such as "tasks".

While this application is primarily discussed as a method, a person of ordinary skill in the art will understand that the application also extends to an apparatus such as a messaging server programmed to enable the practice of the method. Moreover, an article of manufacture for use with the messaging server, such as a pre-recorded storage device or other similar computer readable medium including program instructions recorded thereon, or a computer data signal carrying computer readable program instructions, may direct a messaging server to facilitate the practice of the method. It is understood that such apparatus, articles of manufacture, and computer data signals also come within the scope of the application.

The embodiments of the application described above are intended to be examples only. Those of skill in the art may effect alterations, modifications and variations to the particular embodiments without departing from the scope of the application. The subject matter described herein in the recited claims intends to cover and embrace all suitable changes in technology.

The invention claimed is:

1. A method for handling electronic meeting communications for multiple formats, the method comprising the steps of:

receiving on a messaging server a first electronic meeting communication having a first meeting component in a first format, the first meeting component including event information;

determining a second meeting component in a second format different from the first format, the second meeting component including substantially the same event information as the first meeting component;

creating a second electronic meeting communication comprising at least both the first and second meeting components by inserting the second meeting component into the first electronic meeting communication;

sending the second electronic meeting communication from the messaging server;

receiving the second electronic meeting communication on a recipient device;

determining a preferred one of the first meeting component and the second meeting component;

selecting the preferred one of the first meeting component and the second meeting component and disregarding the other one of the first meeting component and the second meeting component;

wherein the first meeting component and the second meeting component are one of: an iCalendar message component in accordance with the iCalendar standard, a proprietary message header component in accordance with a proprietary message header format, and a text component readable by normal email clients;

wherein the first meeting component and the second meeting component are each in a different format; and processing the selected meeting component.

2. The method as claimed in claim 1, wherein the first meeting component is one of at least two meeting components in one or more respective formats in the first electronic meeting communication.

3. The method as claimed in claim 1, further comprising determining a third meeting component in a third format different from both the first and second formats, the third meeting component including substantially the same event information as the first meeting component, wherein the second electronic meeting communication further comprises the third meeting component, wherein determining a preferred one comprises determining the preferred one of the first meeting component, the second meeting component and the third meeting components, and wherein selecting the preferred one comprises selecting the preferred one of the first meeting component, the second meeting component and the third meeting components and disregarding the other ones of the first meeting component, the second meeting component and the third meeting components.

4. The method as claimed in claim 3, wherein creating the second electronic meeting communication comprises inserting the second and third meeting components into the first electronic meeting communication received on the messaging server.

5. The method as claimed in claim 3, wherein the, third meeting component is one of: an iCalendar message component in accordance with the iCalendar standard, a proprietary message header component in accordance with a proprietary message header format, and a text component readable by normal email clients, wherein the first component, second component, and third component are each in a different format.

6. The method of claim 1, wherein the proprietary message header format is compatible with one or more Lotus Notes proprietary message header formats.

7. The method of claim 1, wherein the proprietary message header component is positioned at the beginning of the second electronic meeting communication, the text component is positioned within the second electronic meeting communication after the proprietary message header component, and the iCalendar component is positioned within the second electronic meeting communication after the text component.

8. The method of claim 7, wherein the second electronic meeting communication is an email message.

9. The method of claim 6, wherein the second electronic meeting communication has a global content-type of multipart/alternative.

10. A non-transitory computer readable medium comprising program instructions recorded thereon executable on a computing device having a programmable processor for implementing the method as claimed in claim 1.

11. The method of claim 1, wherein the at least first and second meeting components are arranged according to a predetermined order.

12. The method of claim 11, wherein the predetermined order is in increasing order of preference.

13. The method of claim 1, further comprising one of formatting or reformatting the second electronic meeting communication in accordance with Multipurpose Internet Mail Extensions (MIME) standard.

14. A messaging server for generating electronic meeting communications for multiple formats, the messaging server being in communication with one or more client devices via a communications network, the messaging server comprising:
   a communication subsystem for sending and receiving electronic communications;
   a processor and memory, the memory including data and instructions to configure the processor to:
      receive on the messaging server a first electronic meeting communication having a first meeting component in a first format, the first meeting component including event information;
      determine a second meeting component in a second format different from the first format, the second meeting component including substantially the same event information as the first meeting component;
      create a second electronic meeting communication comprising at least both the first and second meeting components by inserting the second meeting component into the first electronic meeting communication;
      wherein one of the first meeting component and second meeting component is preferred for use by a recipient device configured to select one of the first meeting component and the second meeting component and disregard the other of the first meeting component and the second meeting component;
      wherein the first meeting component and the second meeting component are one of: an iCalendar message component in accordance with the iCalendar standard, a proprietary message header component in accordance with a proprietary message header format, and a text component readable by normal email clients;
      wherein the first meeting component and the second meeting component are each in a different format; and
      send the second electronic meeting communication from the messaging server to the recipient device.

15. The messaging server as claimed in claim 14, wherein the first meeting component is one of at least two meeting components in one or more respective formats in the first electronic meeting communication.

16. The messaging server as claimed in claim 14, wherein the memory includes data and instructions to further configure the processor to determine a third meeting component in a third format different from both the first and second formats, the third meeting component including substantially the same event information as the first meeting component, wherein the second electronic meeting communication further comprises the third meeting component, wherein one of the first meeting component, the second meeting component and the third meeting component is preferred for use by the recipient device, the recipient device being configured to select one of the first meeting component, the second meeting component and the third meeting component and disregard the others of the first meeting component, the second meeting component and the third meeting component.

17. The messaging server as claimed in claim 16, wherein the memory includes data and instructions to further configure the processor to create the second electronic meeting communication comprising inserting the second and third meeting components into the first electronic meeting communication received on the messaging server.

18. The messaging server as claimed in claim 16, wherein the third meeting component is one of: an iCalendar message component in accordance with the iCalendar standard, a proprietary message header component in accordance with a proprietary message header format, and a text component readable by normal email clients, wherein the first component, second component, and third component are each in a different format.

19. The messaging server of claim 14, wherein the proprietary message header format is compatible with one or more Lotus Notes proprietary message header formats.

20. The messaging server of claim 19, wherein the second electronic meeting communication has a global content-type of multipart/alternative.

21. The messaging server of claim 14, wherein the proprietary message header component is positioned at the beginning of the second electronic meeting communication, the text component is positioned within the second electronic meeting communication after the proprietary message header component, and the iCalendar component is positioned within the second electronic meeting communication after the text component.

22. The messaging server of claim 21, wherein the second electronic meeting communication is an email message.

23. The messaging server of claim 14, wherein the at least first and second meeting components are arranged according to a predetermined order.

24. The messaging server of claim 23, the predetermined order is in increasing order of preference.

25. The messaging server of claim 14, wherein the memory includes data and instructions to further configure the processor to perform one of formatting or reformatting the second electronic meeting communication in accordance with Multipurpose Internet Mail Extensions (MIME) standard.

26. A method for use on a messaging server for generating electronic meeting communications for multiple formats, the method comprising the steps of:
receiving on the messaging server a first electronic meeting communication having a first meeting component in a first format, the first meeting component including event information;
determining a second meeting component in a second format different from the first format, the second meeting component including substantially the same event information as the first meeting component;
creating a second electronic meeting communication comprising at least both the first and second meeting components by inserting the second meeting component into the first electronic meeting communication;
wherein one of the first meeting component and second meeting component is preferred for use by a recipient device configured to select one of the first meeting component and the second meeting component and disregard the other of the first meeting component and the second meeting component;
wherein the first meeting component and the second meeting component are one of: an iCalendar message component in accordance with the iCalendar standard, a proprietary message header component in accordance with a proprietary message header format, and a text component readable by normal email clients;
wherein the first meeting component and the second meeting component are each in a different format; and
sending the second electronic meeting communication from the messaging server to the recipient device.

27. The method as claimed in claim 26, wherein the first meeting component is one of at least two meeting components in one or more respective formats in the first electronic meeting communication.

28. The method as claimed in claim 26, further comprising determining a third meeting component in a third format different from both the first and second formats, the third meeting component including substantially the same event information as the first meeting component, wherein the second electronic meeting communication further comprises the third meeting component, wherein one of the first meeting component, the second meeting component and the third meeting component is preferred for use by the recipient device, the recipient device being configured to select one of the first meeting component, the second meeting component and the third meeting component and disregard the others of the first meeting component, the second meeting component and the third meeting component.

29. The method as claimed in claim 28, wherein creating the second electronic meeting communication comprises inserting the second and third meeting components into the first electronic meeting communication received on the messaging server.

30. The method as claimed in claim 28, wherein the, third meeting component is one of: an iCalendar message component in accordance with the iCalendar standard, a proprietary message header component in accordance with a proprietary message header format, and a text component readable by normal email clients, wherein the first component, second component, and third component are each in a different format.

31. The method of claim 26, wherein the proprietary message header format is compatible with one or more Lotus Notes proprietary message header formats.

32. The method of claim 31, wherein the second electronic meeting communication has a global content-type of multipart/alternative.

33. The method of claim 26, wherein the proprietary message header component is positioned at the beginning of the second electronic meeting communication, the text component is positioned within the second electronic meeting communication after the proprietary message header component, and the iCalendar component is positioned within the second electronic meeting communication after the text component.

34. The method of claim 33, wherein the second electronic meeting communication is an email message.

35. The method of claim 26, wherein the at least first and second meeting components are arranged according to a predetermined order.

36. The method of claim 35, wherein the predetermined order is in increasing order of preference.

37. The method of claim 26, further comprising one of formatting or reformatting the second electronic meeting communication in accordance with Multipurpose Internet Mail Extensions (MIME) standard.

* * * * *